United States Patent
Ueoka et al.

(10) Patent No.: US 7,562,109 B2
(45) Date of Patent: Jul. 14, 2009

(54) CONNECTIVITY CONFIRMATION METHOD FOR NETWORK STORAGE DEVICE AND HOST COMPUTER

(75) Inventors: Atsushi Ueoka, Yokohama (JP); Takeshi Ishizaki, Yokohama (JP); Kiminori Sugauchi, Yokohama (JP); Emiko Kobayashi, Yokohama (JP); Jun Mizuno, Yokohama (JP); Toui Miyawaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 657 days.

(21) Appl. No.: 10/866,402

(22) Filed: Jun. 10, 2004

(65) Prior Publication Data

US 2005/0204049 A1   Sep. 15, 2005

(30) Foreign Application Priority Data

Mar. 10, 2004   (JP) ............................. 2004-066978

(51) Int. Cl.
  G06F 15/16   (2006.01)
  G06F 12/00   (2006.01)
  G06F 12/02   (2006.01)
(52) U.S. Cl. ................ 709/200; 709/208; 709/213; 709/215; 709/229; 711/147; 711/153
(58) Field of Classification Search ................ 709/229, 709/208, 213, 215; 711/147, 153
See application file for complete search history.

(56) References Cited

U.S. PATENT DOCUMENTS

| | | | |
|---|---|---|---|
| 6,487,680 B1 | 11/2002 | Skazinski et al. | |
| 6,636,981 B1 | 10/2003 | Barnett et al. | |
| 6,766,466 B1 | 7/2004 | Jibbe | |
| 7,007,152 B2 * | 2/2006 | Pesola et al. | ................ 711/202 |
| 2003/0101239 A1 * | 5/2003 | Ishizaki | ...................... 709/219 |
| 2003/0212785 A1 | 11/2003 | Jibbe | |
| 2004/0044744 A1 * | 3/2004 | Grosner et al. | ............... 709/217 |
| 2004/0181600 A1 | 9/2004 | Yamagami | |

OTHER PUBLICATIONS

Postel, J. "Internet Control Message Protocol", Network Group, Sep. 1981, Updates: RFCs 777,760, IENs 109,128.

* cited by examiner

*Primary Examiner*—Salad Abdullahi
*Assistant Examiner*—Sahera Halim
(74) *Attorney, Agent, or Firm*—Townsend and Townsend and Crew LLP

(57) ABSTRACT

The present invention decreases the burden of operation required for specifying the continuity status and the cause of failure of a network storage device. A host computer accepts the specification of the device identifier, that is an identifier of the network storage device in the host protocol which positions in a higher hierarchy than the network communication protocol, and a volume identifier, that is an identifier of the volume. Then based on the specified device identifier, the host computer specifies the network identifier, that is an identifier of the network storage device in the network communication protocol. And continuity is confirmed in the network communication protocol in which the specified network identifier is the destination. Also continuity is confirmed in the host protocol in which the device identifier is the destination. And the volume specified by the volume identifier is accessed.

9 Claims, 8 Drawing Sheets

ACCESS MANAGEMENT TL 3123

| LUN 31231 | iSCSI NAME 31232 | IP ADDRESS 31233 |
|---|---|---|
| *** | ******* | ********  |
| *** | ******* | ******** |
| ⋮ | ⋮ | ⋮ |
| ⋮ | ⋮ | ⋮ |

STORAGE MANAGEMENT TL 124

| IP ADDRESS 1241 | iSCSI NAME 1242 |
|---|---|
| ******* | ********* |
| ******* | ********* |
| ⋮ | ⋮ |
| ⋮ | ⋮ |

CONNECTIVITY CONFIRMATION METHOD FOR NETWORK STORAGE DEVICE AND HOST COMPUTER

CROSS-REFERENCES TO RELATED APPLICATIONS

This application relates to and claims priority from Japanese Patent Application No. 2004-066978, filed on Mar. 10, 2004, the entire disclosure of which is incorporated herein by reference.

BACKGROUND OF THE INVENTION

1. Field of the Invention

The present invention relates to a technology for confirming continuity between a network storage device and a host computer.

2. Description of the Related Art

This is a network storage device for providing volumes to a host computer via a network. The network storage device communicates with the host computer according to the network communication protocol used by the network to be connected. There are many types of networks, and the IP (Internet Protocol) network is one of them.

The protocol of the IP network has been standardized by the IETF (Internet Engineering Task Force), and protocols are hierarchical. For example, iSCSI (Small Computer Systems Interface protocol over the Internet) is a protocol for using the network storage device to be connected to the IP network, and is a host protocol which positions in the higher hierarchy of the IP.

In the IP network, Ping, which confirms continuity using the ICMP (Internet Control Message Protocol) standardized by the IETF, is widely known as a means for the host computer to confirm continuity with the network connection device. The host computer can confirm continuity with the device having a specified IP address in the IP layer, by using Ping (J. Postel, "RFC-792 Internet Control Message Protocol," IETF, 1981).

SUMMARY OF THE INVENTION

If continuity is disabled in the host protocol or if the host computer cannot access (mount) the volume of the network storage device, the host computer cannot access the network storage device even if continuity is confirmed in the network communication protocol.

Accessibility of the host computer to the network storage device can also be manually confirmed by the user, sequentially performing continuity confirmation in the network communication protocol, continuity confirmation in the host protocol and access confirmation to the volume. With this method, however, the user must input a command for confirming continuity in each hierarchy into the host computer by specifying the identifier of the network storage device in the network communication protocol (e.g. IP address in the case of IP), the identifier of the network storage device in the host protocol (e.g. iSCSI name in the case of iSCSI) and the identifier of the volume of the network storage device (e.g. LUN: Logical Unit Number). So if the number of network storage devices and the number of volumes of the network storage device increases, the number of times of operation increases, and the operation becomes complicated. Also if some failure occurs, operation to specify the cause thereof becomes complicated, and the failure cannot be handled quickly.

With the foregoing in view, it is an object of the present invention to decease the burden of operation required for confirming the continuity status of the network storage device and specifying the cause of failure.

To solve the above problem, according to the present invention, the specification of an identifier of a network storage device (called device identifier) in a host protocol that positions in a higher hierarchy than a network communication protocol, and an identifier of the volume (called the volume identifier) provided by the network storage device is accepted from a user. Then based on the specified device identifier, the identifier of this network storage device (called network identifier) in the network communication protocol is specified. And continuity confirmation is executed in the network communication protocol of which destination is the specified network identifier, and the execution result thereof is output. If the continuity in the network communication protocol is confirmed, the continuity confirmation is executed in the host protocol of which the destination is the device identifier specified by the user, and the execution result thereof is output. Finally, if the continuity in the host protocol is confirmed, access (mount) to the volume specified by the specified volume identifier is executed, and the execution result is output.

For example, the present invention is a continuity confirmation method for a network storage device for a host computer to confirm continuity with the network storage device for providing a volume via the network, the method performing: an acceptance step for accepting the specification of a device identifier, that is, an identifier of a network storage device in a host protocol that positions in a higher hierarchy than a network communication protocol used by the network, and a volume identifier that is an identifier of the volume, from a user via an input device; and a volume accessibility decision step for deciding whether the host computer can access the volume of the network storage device specified by the device identifier and the volume identifier accepted in the acceptance step, wherein the volume accessibility decision step further comprises: a network continuity confirmation step for specifying a network identifier corresponding to the device identifier accepted in the acceptance step using a storage management table in which the correspondence relationship between the network identifier, that is an identifier of the network storage device in the network communication protocol, and the device identifier is registered, executing confirmation continuity processing in the network communication protocol between the network storage device having the specified network identifier and the host computer, and outputting the result to an output device; a storage connection confirmation step for executing the connection confirmation processing in the host protocol between the network storage device having the device identifier accepted in the acceptance step and the host computer, and outputting the result to the output device; and access confirmation step for executing access confirmation processing for confirming whether the host computer can access the volume of the network storage device specified by the device identifier and the volume identifier accepted in the acceptance step, and outputting the result to the output device.

According to the present invention, the network identifier is specified by the user specifying the device identifier and the volume identifier, so the user need not know the network identifier. The continuity confirmation in the network communication protocol, the continuity confirmation in the host protocol and the access confirmation to the volume are sequentially executed, and the results thereof are output, so the continuity status of the network storage device and the cause of the failure can be easily specified.

DESCRIPTION OF THE PREFERRED EMBODIMENTS

A computer system according to an embodiment of the present invention will now be described using an example when IP is used for the network communication protocol and iSCSI is used for the host protocol of the network communication protocol in the storage area network (SAN) between the host computer and the network storage device.

(1) System Configuration

Figure 1:
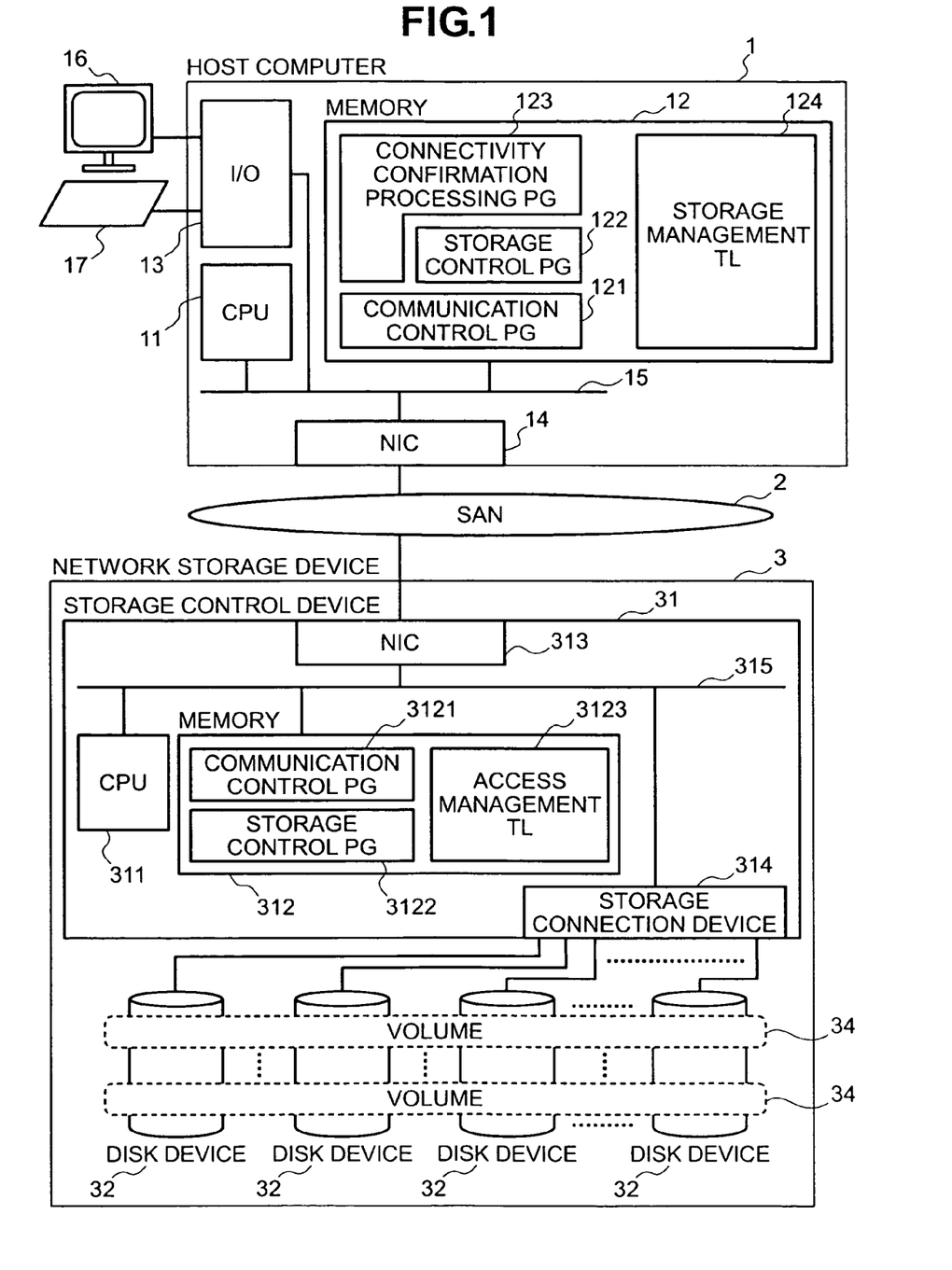
FIG. 1 is a schematic diagram depicting the computer system to which the first embodiment of the present invention is applied.

FIG. 1 is a schematic diagram depicting a computer system to which the first embodiment of the present invention is applied.

As FIG. 1 shows, the computer system of the present embodiment is comprised of a host computer 1 and network storage device 3 which are connected to the SAN 2.

The network storage device 3 provides a volume 34 to the host computer 1 via the SAN 2. Here the volume 34 is a logical storage area which is comprised of at least one disk device 32. As FIG. 1 shows, the network storage device 3 is comprised of a storage control device 31 and at least one disk device 32. The storage control device 31 is further comprised of a CPU 311, memory 312, an NIC (Network Interface Card) 313 to be connected to the SAN 2, a storage connection device 314, and an internal bus 315 for connecting these elements 311 to 314. The storage connection device 314 controls the data transfer to the volume 34 according to the instructions from the CPU 311.

In the memory 312, the communication control (PG) program 3121, storage control (PG) program 3122 and access management (TL) table 3123 are stored.

Figure 2:
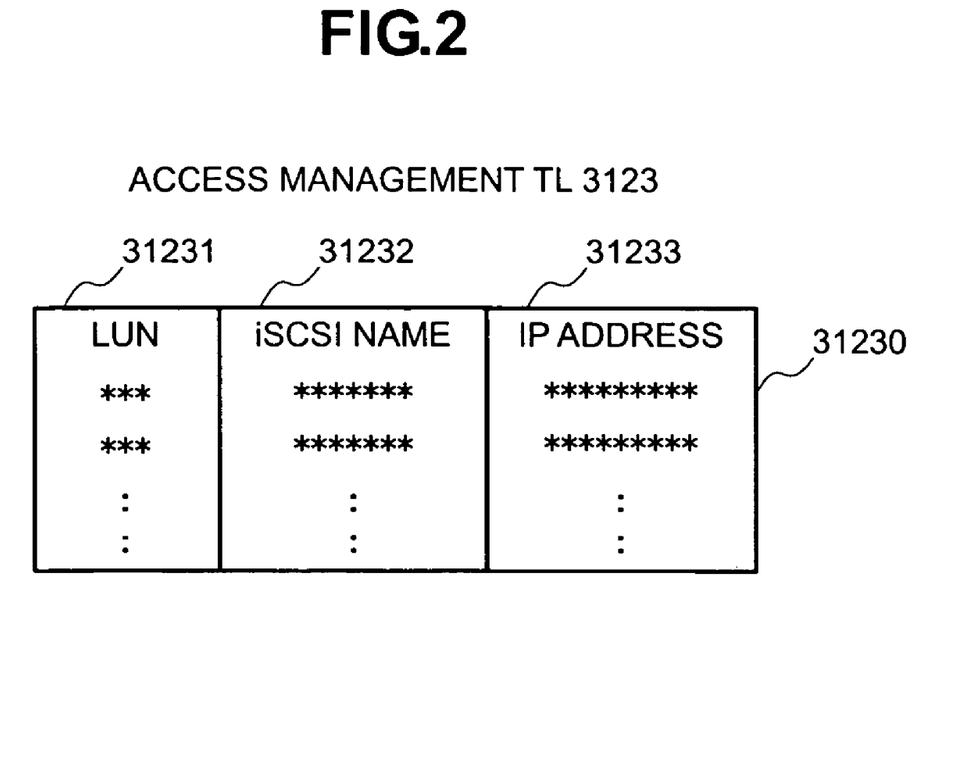
FIG. 2 is a table showing a registration content example of the access management table 3123.

The access management table 3123 is a table for managing the host computer 1 which can access the volume 34. FIG. 2 is a table showing a registration content example of the access management table 3123. As FIG. 2 shows, an entry 31230 is registered for each volume 34 in the access management TL table 3123. The entry 31230 is comprised of a field 31231 for registering the LUN of the volume 34, a field 31232 for registering the iSCSI name of the host computer 3 which can access the volume 34, and a field 31233 for registering the IP address of the host computer 3 which can be connected to the local network storage device 3 which provides the volume 34.

The CPU 311 performs the processing of TCP/IP required for communication with the host computer 1 by executing the communication control program 3121. Also [the CPU 311] returns a reply to the Ping command addressed from the host computer 1 to the local network storage device 3. The CPU 311 also executes the storage control program 3122, so as to control the storage connection device 314 and the read/write data to the volume 34. [The CPU 311] also performs the iSCSI processing required for a iSCSI target. [The CPU 311] also performs authentication processing for the Login command from the host compute 3 and access (mount) possibility decision processing to the volume 34 of the host computer 3 using the access management table 3123.

The host computer 1 accesses the volume 34 of the network storage device 3 via the SAN 2, and reads/writes data stored in the volume 34. As illustrated, the host computer 1 is comprised of the CPU 11, memory 12, I/O 13 for connecting the display device 16 and input device 17, NIC 14 for connecting to the SAN 2, and internal bus 15 for connecting these elements 11 to 15.

In the memory 12, the communication control (PG) program 121, storage control processing (PG) program 122, continuity confirmation processing (PG) program 123 and storage management (TL) table 124 are stored.

Figure 3:
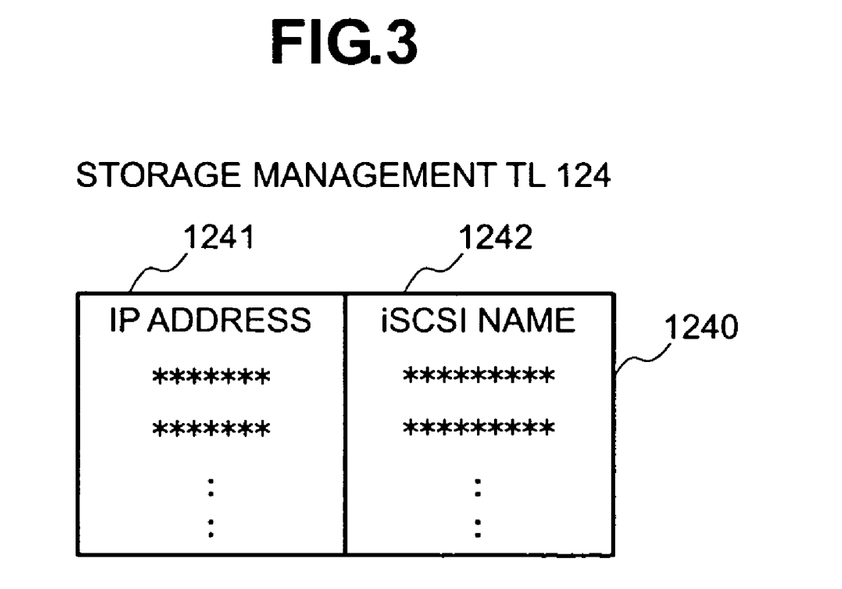
FIG. 3 is a table showing a registration content example of the storage management table 124.

The storage management table 124 is a table for managing the network storage device 3 to which the local host computer 1 can connect. FIG. 3 is a table showing a registration content example of the storage management table 124. As FIG. 3 shows, in the storage management TL 124, the entry 1240 is registered for each iSCSI name of the network storage device 3. The entry 1240 is comprised of a field 1241 for registering the IP address of the network storage device 3, and a field 1242 for registering the iSCSI name of the network storage device 3.

The CPU 11 executes the communication control program 121 for executing TCP/IP processing required for communication with the network storage device 3. [The CPU 11] also sends the Ping command to the IP address specified by the continuity confirmation processing program 123, receives the response thereof, and transfers it to the continuity confirmation processing program 123. The CPU 11 also executes the storage control program 122 to execute the iSCSI processing required for an iSCSI initiator. [The CPU 11] also sends the Login command to the iSCSI name specified by the continuity confirmation processing program 123, receives the response data thereof, and transfers it to the continuity confirmation processing program 123. [The CPU 11] also sends the mount command to the iSCSI name and the LUN specified by the continuity confirmation processing program 123, receives the response data thereof, and transfers it to the continuity confirmation processing program 123. Also the CPU 11 executes the continuity confirmation processing program 123 to execute the processing for confirming whether the volume 24 provided by the network storage device 3 can be accessible (called volume accessibility decision processing).

(2) Volume Accessibility Decision Processing

Figure 4:
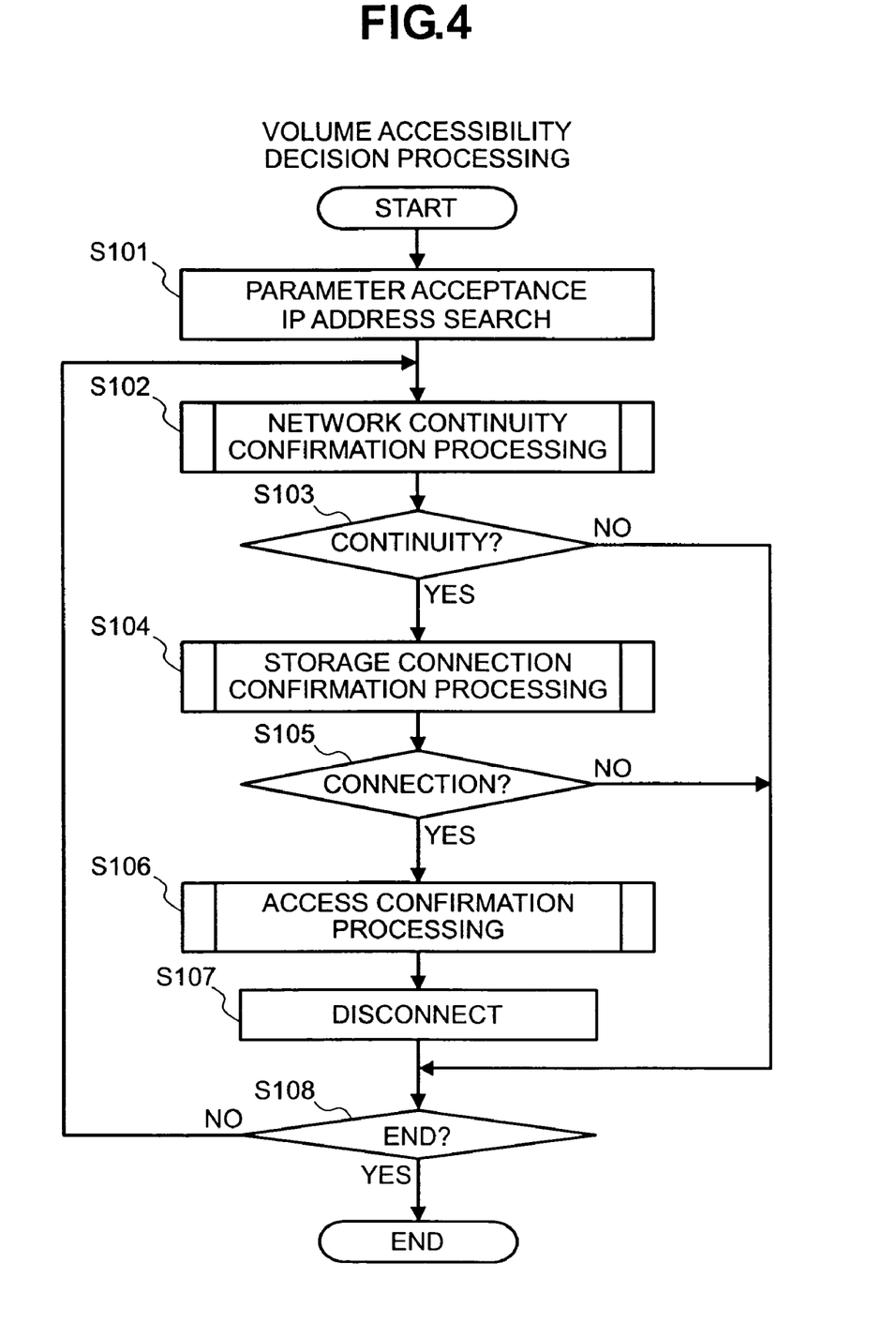
FIG. 4 is a flow chart depicting the volume accessibility decision processing.

Now the volume accessibility decision processing executed by the host computer 1 will be described. FIG. 4 is a flow chart depicting the volume accessibility decision processing. This flow is started in the host computer 1 by the CPU 11 executing the continuity confirmation processing PG program 123.

At first, the CPU 11 accepts the input of the number of times of execution for the volume accessibility decision, the LUN of the volume 34 for which accessibility is decided, and the iSCSI name of the network storage device 3 which provides this volume, from the user via I/O 13 and input device 17. Then using the storage management table 124, [the CPU 11] searches the IP address registered in the entry 1240 with the iSCSI name received from the user (S101). Also [the CPU 11] sets the number of times of execution N of the accessibility decision to 1.

Then the CPU 11 executes continuity confirmation processing with the network storage device 3 having the searched IP address in the IP layer (called network continuity confirmation processing) (S102). Details of the network continuity confirmation processing will be described later.

Then the CPU 11 analyzes the result of the network continuity confirmation processing (S103). If the processing result indicates "No continuity", [processing] moves to S108. If the processing result indicates "Continuity", on the other hand, the CPU 11 executes connection confirmation processing with the network device 3 having the iSCSI name received from the user in the iSCSI layer (called storage connection confirmation processing) (S104). Details of the storage connection confirmation processing will be described later.

Then the CPU 11 analyzes the result of the storage connection confirmation processing (S105). If the processing indicates "No connection", [processing] moves to S108. If the processing result indicates "Connection", on the other hand, the CPU 11 executes processing for confirming whether the volume 34 specified by the iSCSI name and the LUN received from the user is accessible (called access confirmation processing) (S106). Details of the access confirmation processing will be described later.

Then the CPU 11 executes disconnection processing of the iSCSI session established with the iSCSI target by the storage connection confirmation processing (S107), and [processing] moves to S108.

Then in S108, the CPU 11 judges whether the number of times of the execution N of the accessibility decision reaches the number of times of the execution of the accessibility decision received from the user. If reached, this flow is ended. If not reached, the number of times of the execution N of the accessibility decision is incremented by 1, and [processing] returns to S102.

(3) Network Continuity Confirmation Processing

Figure 5:
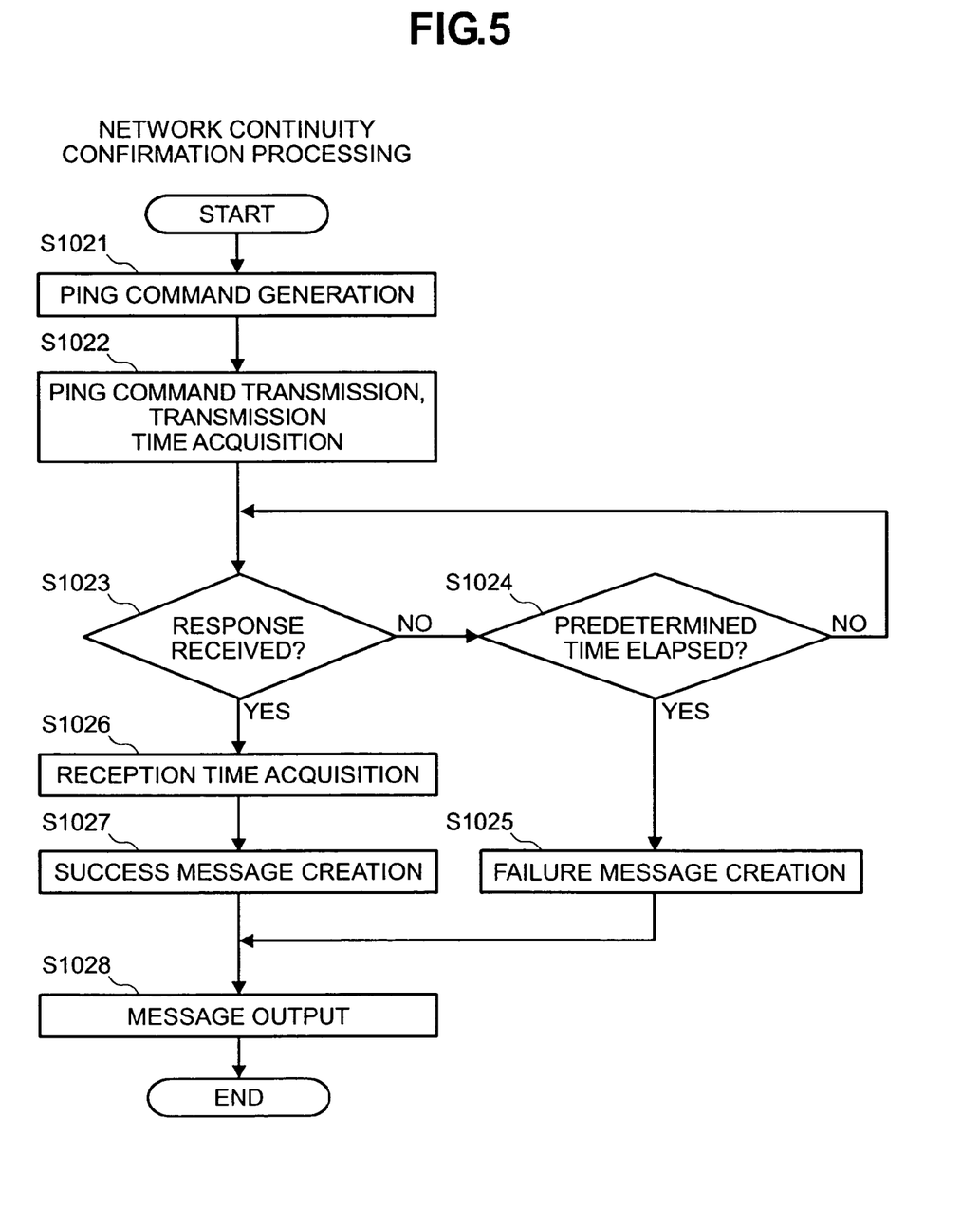
FIG. 5 is a flow chart depicting the network continuity confirmation processing.

Now the network continuity confirmation processing executed in S102 of FIG. 4 will be described. FIG. 5 is a flow chart depicting the network continuity confirmation processing.

At first, the CPU 11 generates a Ping command (echo request of ICMP) to the IP address searched in S101 of FIG. 4 according to the communication control program 121 (S1021). Then [the CPU 11] sends the generated Ping command to the SAN 2 via the NIC 14, and acquires the transmission time based on the internal timer, which is not illustrated (S1022). And the CPU 11 waits for the response to the Ping command for a predetermined time (S1023, S1024). In the storage control device 31, if the CPU 311 receives the Ping command via the NIC 313, [the CPU 311] generates the response according to the communication control program 3121, and sends it to the transmission source of the Ping command.

In S1023 and S1024, if the response to the Ping command is not received within a predetermined time, the CPU 11 judges that there is no continuity with the transmission destination of the Ping command in the IP layer, generates a message to notify this (S1025), and displays it on the display device 16 (S1028). For example, such a message as "S-ID network continuity confirmation failed (NS-ID)" is displayed on the display device 16. Here, "S-ID" is an iSCSI name of the network storage device 3 received from the user in S101 of FIG. 4, and "NS-ID" is an IP address of this network storage device 3 searched in S101 of FIG. 4.

If a response to the Ping command is received within a predetermined time in S1023 and S1024, the CPU 11 judges that continuity exists with the transmission destination of the Ping command in the IP layer. And [the CPU 11] acquires the reception time from the internal time, which is not illustrated, subtracts the transmission time from this reception time, and calculates the processing time required for the continuity confirmation (S1026). Then the CPU 11 generates a message to indicate "Continuity", including the processing time (S1027), and displays it on the display device 16 (S1028). For example, such a message as "S-ID network continuity confirmation succeeded. Processing time t." is displayed on the display device 16. Here the processing time t is the time calculated in S1026.

(4) Storage Connection Confirmation Processing

Figure 6:
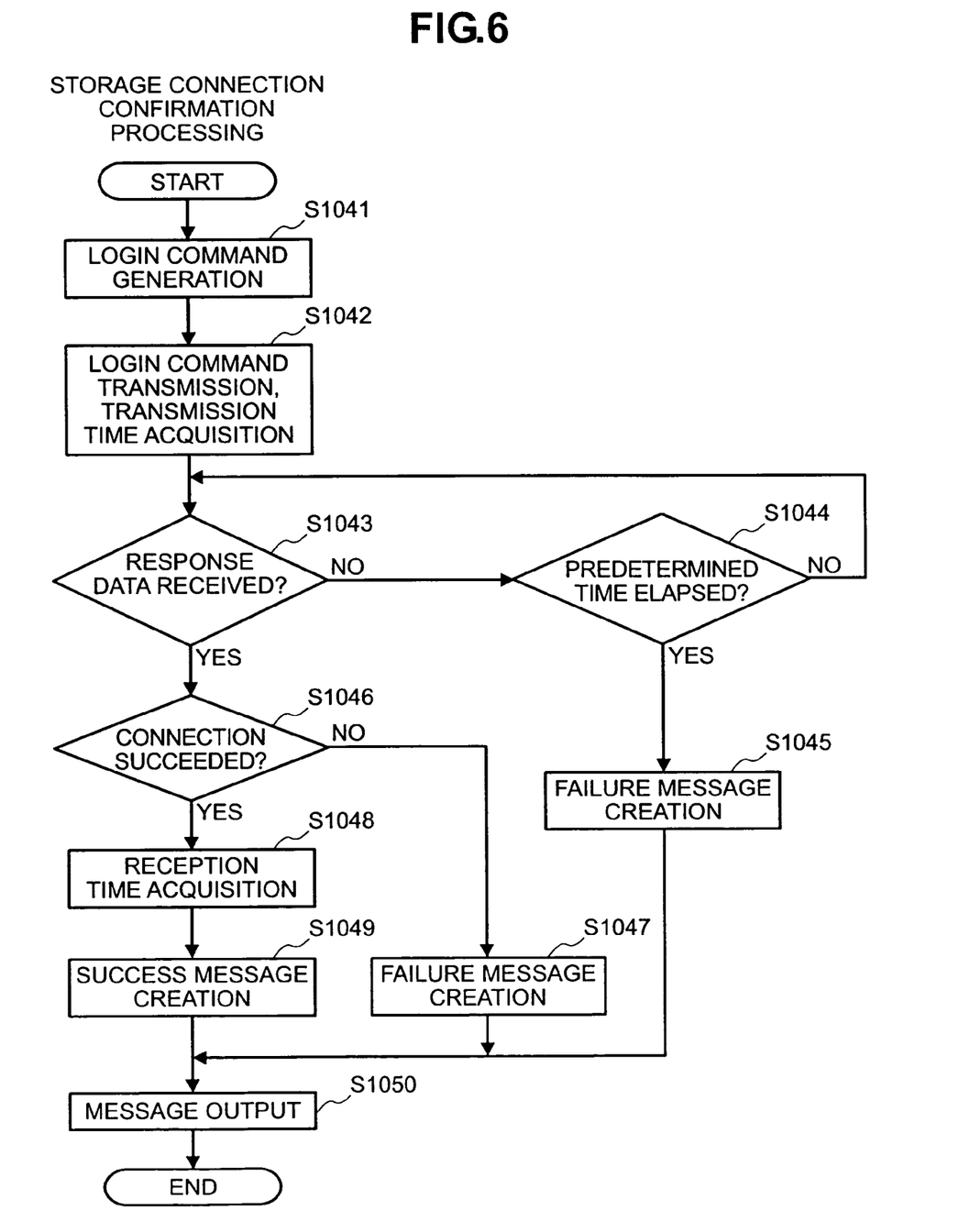
FIG. 6 is a flow chart depicting the storage connection confirmation processing.

Now the storage connection confirmation processing to be executed in S104 of FIG. 4 will be described. FIG. 6 is a flow chart depicting the storage connection confirmation processing.

At first, the CPU 11 generates the iSCSI login command for the network storage device 3 of which continuity was confirmed by the above mentioned network continuity confirmation processing according to the storage control program 121 (S1041).

Figure 7:
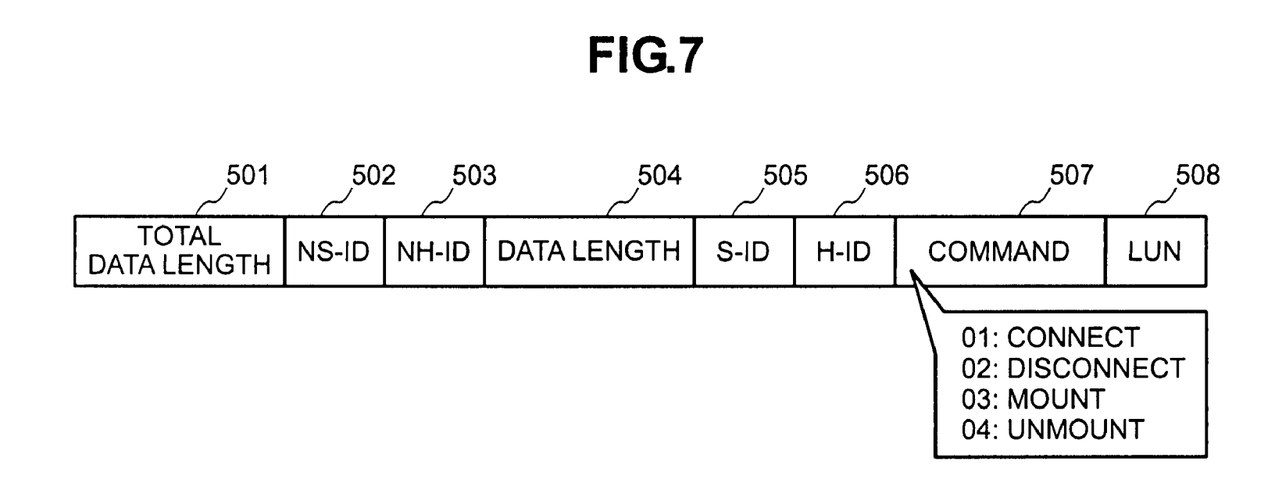
FIG. 7 is an example of the data format of the data to be transmitted to the storage device for continuity confirmation.

FIG. 7 is an example of a data format of the data which is sent for confirming the continuity for the storage device. As FIG. 7 shows, the data to be sent for confirming continuity comprises an overall data length 501 for indicating the length of the entire data, NS-ID 502 which is an IP address of the network storage device 3 at the transmission destination, NH-ID 503 which is an IP address of the host computer 1 at the transmission source, S-ID 505 which is an iSCSI name of the network storage device 3 at the transmission destination (iSCSI target), H-ID 506 which is an iSCSI name of the host computer 1 at the transmission source (iSCSI initiator), command 507 for specifying the processing content (one of 01: connect (login); 02: disconnect (logout); 03: mount; and 04: unmount) of which execution is requested to the storage device 3, LUN 508 of the volume 34 to be a target when the command 507 is mount or unmount, and data length 504 of S-ID 505, H-ID 506, command 507 and LUN 508. Here the iSCSI login command is generated, so "01" is stored in the command 507. In the case of the disconnect processing in S107 in FIG. 4, an iSCSI logout command where "02" is stored in the command 507 is sent to the iSCSI target during the iSCSI session.

Then the CPU 11 sends the generated iSCSI login command to the network storage device 3 of which continuity is confirmed by the above mentioned network continuity confirmation processing. Also [the CPU 11] acquires the transmission time from the internal timer, which is not illustrated (S1042). And the CPU 11 waits for the response data to the iSCSI login command for a predetermined time (S1043, S1044).

In the storage control device 31, the CPU 311 which received the iSCSI login command via the NIC 313 decides the authentication method (e.g. RFC 1510, RFC 2025, RFC 2945, RFC 1944) by negotiation with the iSCSI initiator (storage control program 122 of the host computer 1) according to the storage control program 3122, and executes the authentication processing. And [the CPU 311] generates the response data including the authentication result, and sends it to the iSCSI initiator.

Figure 8:
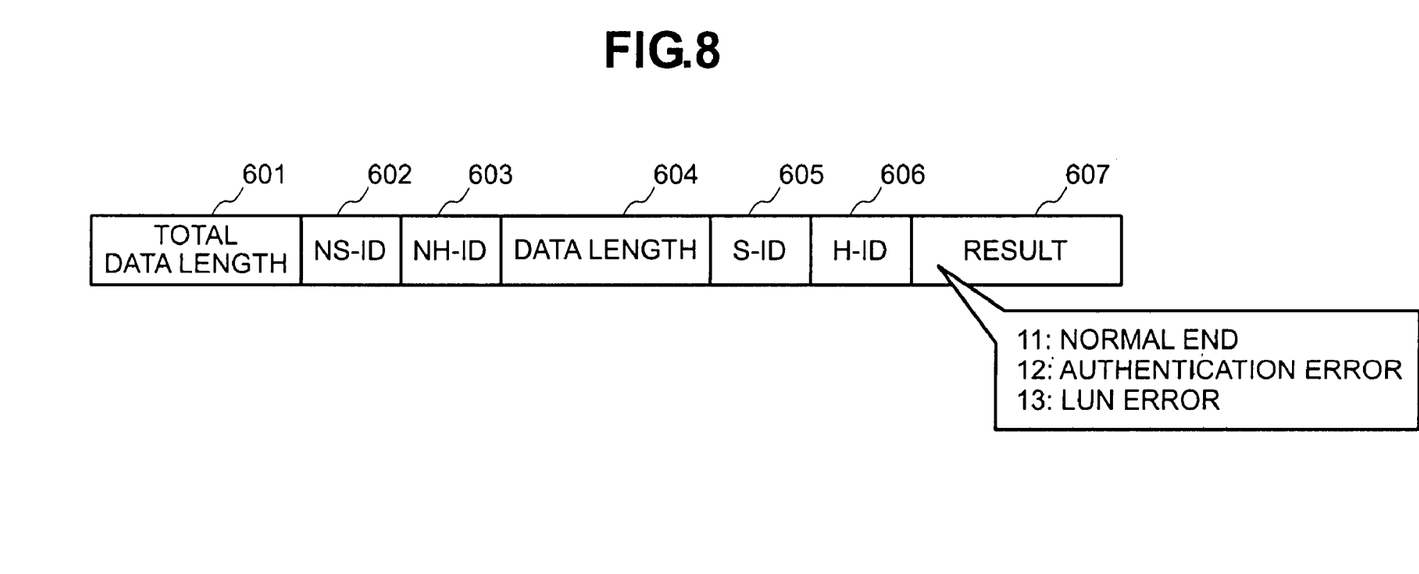
FIG. 8 is an example of the data format of the response data to the data for continuity confirmation.

FIG. 8 is an example of the data format of the response data to the data for confirming continuity. As FIG. 8 shows, the response data to the data for confirming continuity comprises an overall data length 601 which indicates the length of the entire response data, NS-ID 602 which is an IP address of the network storage device 3 at the transmission source, NH-ID 603 which is an IP address of the host computer 1 at the transmission destination, S-ID 605 which is an iSCSI name of the network storage device 3 at the transmission source (iSCSI target), H-ID 606 which is an iSCSI name of the host computer 1 at the transmission destination (iSCSI initiator), result 607 for specifying the execution result of the command (one of 11: normal end; 12: authentication error; 13: LUN error), and data length 604 of S-ID 605, H-ID 606 and the result 607. In this case, the data to be transmitted for confirming continuity, which was transmitted from the host computer 1, is a login command, so either "11" or "12" is stored in the result 607 of the response data.

In S1043 and S1044, if the response data to the iSCSI login command is not received within a predetermined time, the CPU 11 judges this as no continuity with the transmission destination of the iSCSI login command (iSCSI target) in the iSCSI layer, generates a message to indicate "No continuity" (S1045), and displays it on the display device 16 (S1050). For example, such a message as "S-ID storage connection confirmation failed (no response)" is displayed on the display device 16.

If the response data to the iSCSI login command is received within the predetermined time in S1043 and S1044, on the other hand, the CPU 11 analyzes the command execution result stored in the result 607 of this response data (S1046). If the execution result is the authentication error "12", the CPU 11 judges that the transmission destination of the iSCSI login command (iSCSI target) rejected the establishment of the iSCSI session, generates a message to indicate "No connection" (S1047), and displays it on the display device 16 (S1050). For example, a message such as "S-ID storage connection confirmation failed (authentication error)" is displayed on the display device 16.

If the execution result of the login command is normal end "11" in S1046, on the other hand, the CPU 11 judges that an iSCSI session was established with the transmission destination of the iSCSI login command (iSCSI target). And [the CPU 11] acquires the reception time from the internal timer, which is not illustrated, and calculates the processing time required for confirming connection by subtracting the transmission time from this reception time (S1048). Then the CPU 11 generates a message to indicate "Connection" including the processing time (S1049), and displays it on the display device 16 (S1050). For example, a message such as "S-ID storage connection confirmation succeeded. Processing time t." is displayed on the display device 16. Here the processing time t is the time calculated in S1048.

(5) Access Confirmation Processing

Figure 9:
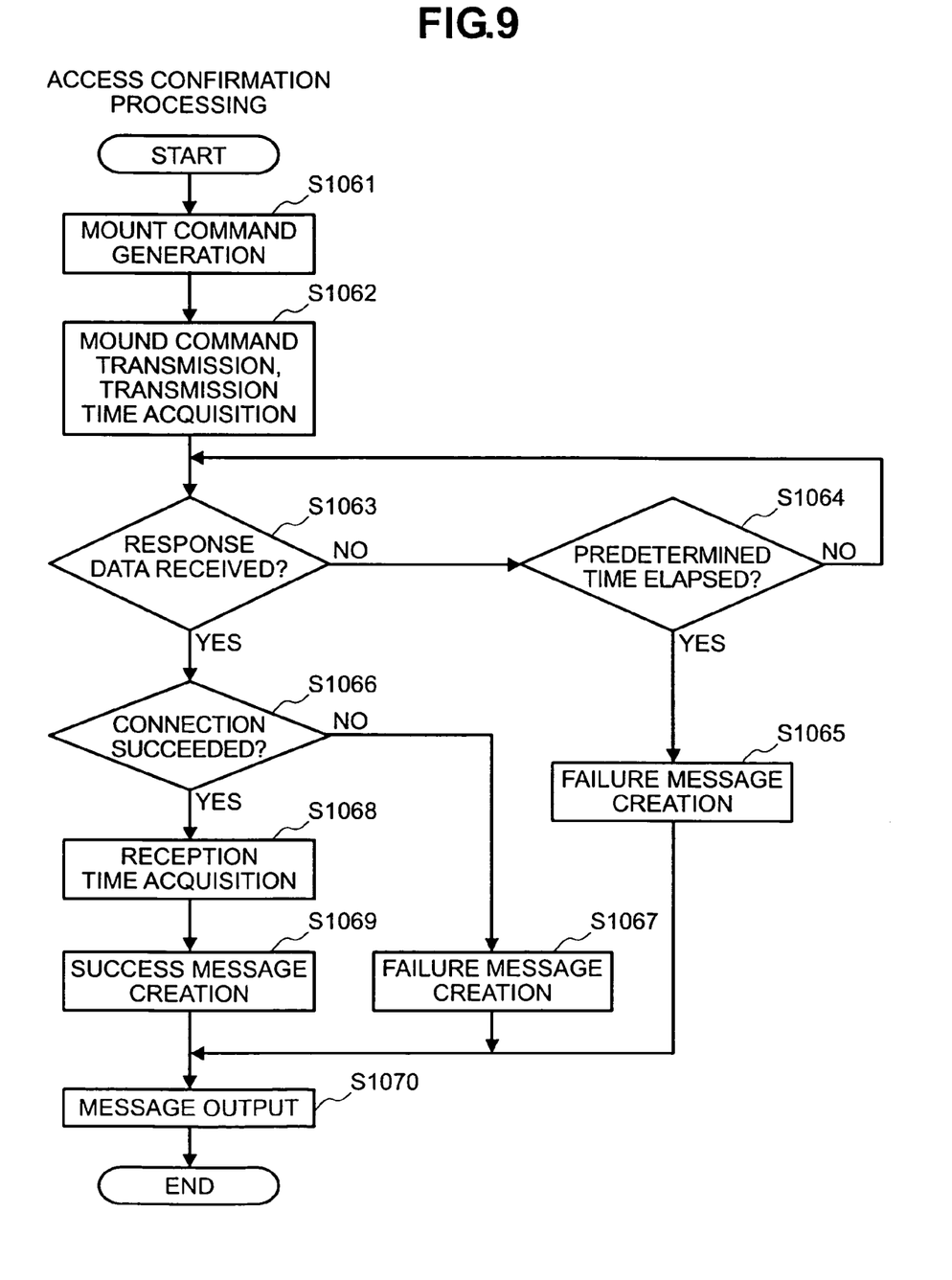
FIG. 9 is a flow chart depicting the access confirmation processing.

Access confirmation processing to be executed in S106 of FIG. 4 will be described. FIG. 9 is a flow chart depicting the access confirmation processing.

At first, the CPU 11 generates the iSCSI mount command for the network storage device 3 of the iSCSI target of which iSCSI connection was established by the above mentioned storage connection confirmation processing according to the storage control program 121 (S1061). This mount command has the data format of the data to be sent for confirming continuity shown in FIG. 7, where "03" is stored in the command 507, and the LUN received from the user in S101 in FIG. 4 is stored of the LUN 508.

Then the CPU 11 sends the generated iSCSI mount command to the network storage device 3 of the iSCSI target of which the iSCSI connection is established by the above mentioned storage connection confirmation processing. And the transmission time is acquired from the internal timer, which is not illustrated (S1062). And the CPU 11 waits for the response data to the iSCSI mount command for a predetermined time (S1063, S1064).

In the storage control device 31, the CPU 311, which received the iSCSI mount command via the NIC 313, decides whether the mounting of the volume 34 having the LUN, specified by the mount command, is enabled by referring to the access management table 3123 according to the storage control program 3122. Specifically, if the entry 31230 which has the LUN specified by the mount command, iSCSI name of the iSCSI initiator (H-ID) and IP address of the host computer 1, which is the iSCSI initiator (NH-ID), are registered in the access management table 3123, the mounting of the LUN is enabled. If not registered, mounting thereof is not enabled. The CPU 311 generates the response data including the decision on mountability, and sends it to the iSCSI initiator. Here, in this response data, "11" is stored in the result 607 in the data format shown in FIG. 8 if mounting is enabled. If mounting is rejected, "12" is stored in the result 607. If the network storage device 3 does not have the LUN specified by the mount command, then "13" is stored in the result 607.

In S1063 and S1064, if the response data to the iSCSI mount command is not received within the predetermined time, the CPU 11 judges that continuity does not exist with the transmission destination of the iSCSI mount command (iSCSI target) in the iSCSI layer, generates a message to indicate "No continuity" (S1065), and displays it on the display device 16 (S1070). For example, such a message as "LUN (S-ID) access confirmation failed (no response)" is displayed on the display device 16. Here LUN is the LUN received from the user in S101 of FIG. 4.

If the response data to the iSCSI mount command is received within the predetermined time in S1063 and S1064, on the other hand, the CPU 11 analyzes the command execution result stored in the result 607 of this response data (S1066). If the execution result is the authentication error "12" or the LUN error "13", the CPU 11 judges that the transmission destination of the iSCSI mount command (iSCSI target) rejected the mounting of LUN or that there is no mounting target LUN, and generates a message to indicate the reason (S1067), and displays it on the display device 16 (S1070). For example, such a message as "LUN (S-ID) access confirmation failed (LUN error)" (in the case of no LUN) or "LUN (S-ID) access confirmation failed (authentication error)" (in the case of rejecting a mount) is displayed on the display device 16.

If the mount command execution result is the normal end "11" in S1066, on the other hand, the CPU 11 judges that the transmission destination of the iSCSI mount command (iSCSI target) mounted the LUN received from the user in S101 in FIG. 4. And [the CPU 11] acquires the reception time from the internal timer, which is not illustrated, and calculates the processing time required for confirming access by subtracting the transmission time from this reception time (S1068). Then the CPU 11 generates a message to indicate "mounting succeeded" including the processing time (S1069), and displays it on the display device 16 (S1070). For example, such a message as "LUN (S-ID) access confirmation succeeded. Processing time t" is displayed on the display device 16. Here the processing time t is the time calculated in S1068.

(6) Message Output

Figure 10:
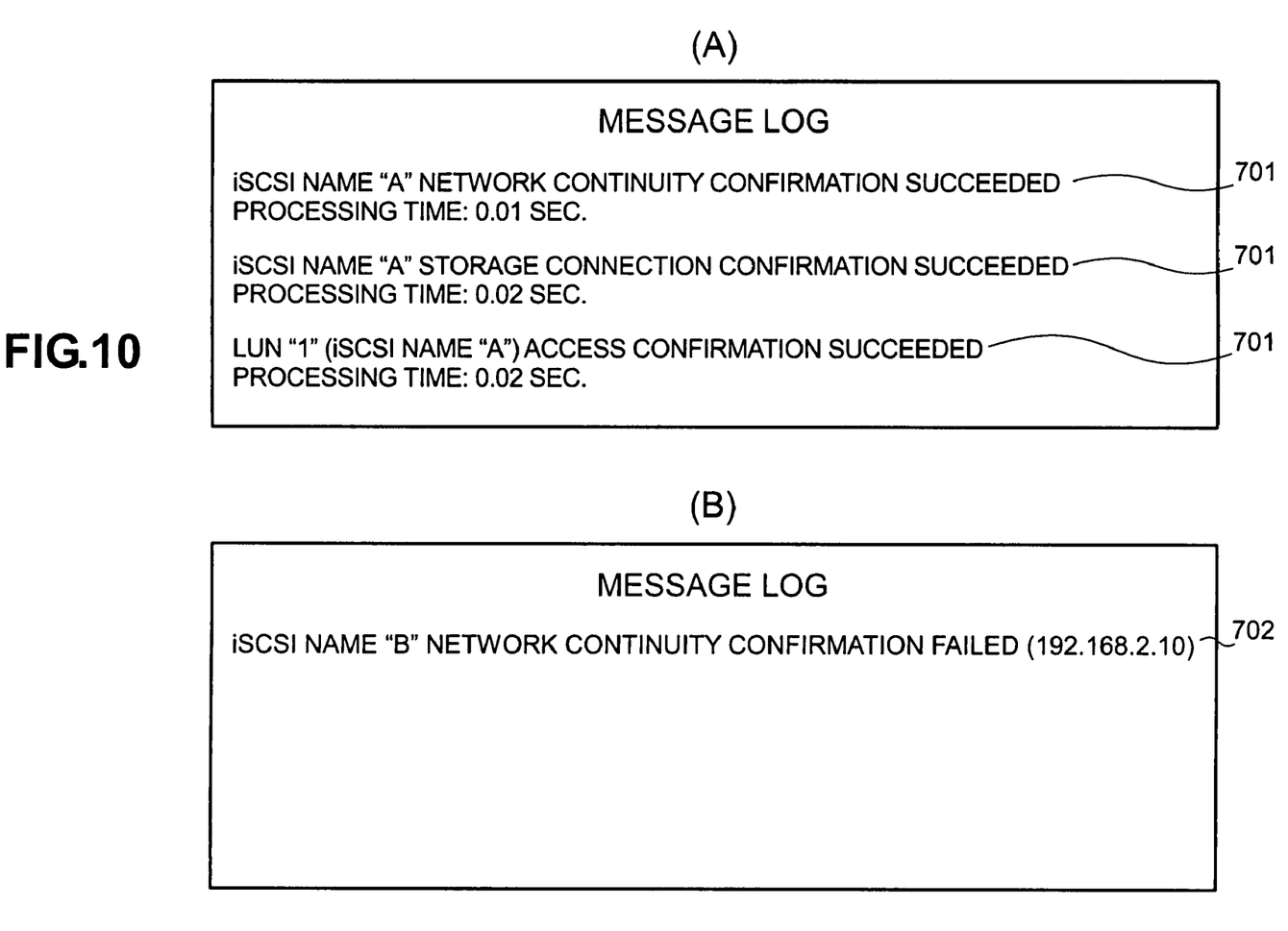
FIG. 10A shows a display example when all of network continuity confirmation processing, storage connection confirmation processing and access confirmation processing succeeded in confirmation.
FIG. 10B shows a display example when the network continuity confirmation processing failed in confirmation.

FIG. 10 shows examples of the messages to be output to the display device 16 by the volume accessibility decision processing shown in FIG. 4. FIG. 10A shows a display example when confirmation succeeded in all of the above mentioned network continuity confirmation processing, storage connection confirmation processing and access confirmation processing, and FIG. 10B shows a display example when confirmation failed in the above mentioned network continuity confirmation processing.

As FIG. 10A shows, a success message 701 is output each time confirmation succeeds in the respective network continuity confirmation processing, storage connection confirmation processing and access confirmation processing. The examples shown in FIG. 10A are success messages 701 when the volume accessibility decision is executed for iSCSI name "A" and LUN "1" of volume 34 of the network storage device 3. Each message 701 includes the processing time, so that the guideline for throughput can be set.

As FIG. 10B shows, if confirmation failed in a confirmation processing, a failure message 702 is output, and confirmation processing after this confirmation is omitted. The example shown in FIG. 10B is a failure message 702 which was output in the network continuity confirmation processing when the volume accessibility decision is executed for the iSCSI name "B" of the network storage device 3. The message 702 includes not only the iSCSI name of the network storage device 3 but also the IP address (192.169.2.10).

An embodiment of the present invention was described above.

In the present embodiment, continuity confirmation between the host computer 1 and the network storage device 3 in the IP layer (network continuity confirmation processing), connection confirmation between the host computer 1 and the network storage device 3 in the iSCSI layer (storage connection confirmation processing), and mountability confirmation for the volume 34 of the network storage device 3 by the host computer 1 (access confirmation processing) are sequentially executed. Therefore when the host computer 1 cannot access the volume 34 of the network storage device 3, the cause can be easily identified. Also when a new host computer 1 or a new network storage device 3 is installed, setup can be easily confirmed. Also the processing time required for the respective confirmation processing is displayed, so the guideline of communication throughput between the host computer 1 and the network storage device 3 can be known. In this way, according to the present embodiment, the burden of operation required for specifying the continuity status and the cause of failure of the network storage device 3 can be decreased.

The present invention is not limited to the above mentioned embodiment, but can be modified in various ways within the scope of the essential characteristics thereof.

For example, in the above embodiment, the volume accessibility decision processing is executed in the sequence of network continuity confirmation processing, storage connection confirmation processing and access confirmation processing, but the present invention is not limited to this. However the cause of failure can be specified more quickly by executing the volume accessibility decision processing in the above sequence.

Also in the above embodiment, an example of SAN 2 where an IP is used as the network communication protocol and an iSCSI is used as a host protocol of the network communication protocol was described. However the present invention is not limited to this. A protocol other than IP may be used as the network communication protocol. In the same way, a protocol other than the iSCSI protocol may be used as the host protocol.

The present invention can be applied in the same way when the connection status between the network device other than the network storage device 3 and the host computer 1 is confirmed.

What is claimed is:

1. A computer-implemented method executed by a processor on a host computer for confirming continuity between the host computer and a network storage device which provides a volume, the host computer and the network storage device being coupled by a network, the method comprising:

an acceptance step for accepting a specification of a device identifier and a volume identifier from a user via an input device, wherein the device identifier is an identifier of a network storage device in a host protocol in a higher hierarchy than a network communication protocol used by the network; and a volume accessibility decision step for deciding whether the host computer can access the volume, wherein the volume accessibility decision step further comprises:

a network continuity confirmation step for specifying a network identifier corresponding to the device identifier using a storage management table in which the relationship between the network identifier and the device identifier is registered, for confirming continuity in the network communication protocol between the network storage device having the specified network identifier and the host computer, and for outputting the result to an output device, wherein the network identifier identifies the network storage device in the network communication protocol, the continuity in the network communication protocol between the network storage device and the host computer being confirmed when a ping command sent from the host computer to the network storage device is returned to the host computer within a predetermined time period;

a storage connection confirmation step for confirming connection in the host protocol between the network storage device and the host computer, and for outputting the result to the output device, wherein the connection in the host protocol between the network storage device and the host computer is confirmed when a login command sent from the host computer to the network storage device is returned to the host computer within a predetermined time period, the network storage device to which the login command is sent being confirmed as having continuity in the network communication protocol in the network continuity confirmation step; and an access confirmation step for performing access confirmation for confirming whether the host computer can access the volume of the network storage device specified by the device identifier and the volume identifier, and for outputting the result to the output device, wherein the host computer is confirmed as accessing the volume when a mount command sent from the host computer to the network storage device is returned to the host computer within a predetermined time period, the network storage device to which the mount command is sent being confirmed as being connected in the host protocol to the host computer in the storage connection confirmation step.

2. The method according to claim 1 wherein the network continuity confirmation step, the storage connection confirmation step and the access confirmation step respectively output the confirmation result to the output device along with the time required for the confirmation.

3. The method according to claim 1 wherein the volume accessibility decision step executes the confirmation steps in the sequence of the network continuity confirmation step, the storage connection confirmation step and the access confirmation step.

4. The method according to claim 3 wherein when the confirmation result indicates that continuity could not be confirmed, the volume accessibility decision step does not execute a confirmation step after the result was output.

5. The method according to claim 1 wherein:
the network communication protocol is an Internet Protocol (IP);
the network identifier is an IP address; and
the network continuity confirmation step performs the continuity confirmation by sending a command to the network storage device having the specified network identifier and confirming a response thereto.

6. The method according to claim 1, wherein:
the host protocol includes a Small Computer Systems Interface protocol over the Internet (iSCSI);
the device identifier includes an iSCSI name; and
the storage connection confirmation step performs the connection confirmation by sending an iSCSI login command to the network storage device having the accepted device identifier, and confirming a response thereto.

7. The method according to claim 1, wherein:
the host protocol includes iSCSI;
the device identifier includes an iSCSI name;
the volume identifier includes a Logical Unit Number (LUN); and
the access confirmation step performs the access confirmation by sending an iSCSI mount command to the network storage device having the accepted device identifier and confirming a response data thereof.

8. A host computer for confirming continuity with a network storage device for providing a volume via a network, the host computer comprising an arithmetic unit, a storage device, an input device, an output device, and a communication device for connecting with a network, wherein:
the storage device includes a storage management table in which a relationship between a network identifier and a device identifier is registered for each network storage device, wherein the network identifier is an identifier of the network storage device in a network communication protocol used by the network, wherein the device identifier is an identifier of the network storage device in a host protocol that is in a higher hierarchy than a network communication protocol;
the arithmetic unit executes processing for accepting the specification of the device identifier and a volume identifier, from a user via the input device, and a volume accessibility decision process for deciding whether the host computer can access the volume of the network storage device specified by the accepted device identifier and volume identifier; and
the volume accessibility decision processing further comprises:
a network continuity confirmation process for specifying a network identifier corresponding to the accepted device identifier using the storage management table, for confirming continuity between the network storage device having the specified network identifier and the host computer in the network communication protocol using the communication device, and for outputting the result to an output device, wherein the network identifier identifies the network storage device in the network communication protocol, the continuity in the network communication protocol between the network storage device and the host computer being confirmed when a ping command sent from the host computer to the network storage device is returned to the host computer within a predetermined time period;
a storage connection confirmation process for confirming a connection between the network storage device having the accepted device identifier and the host computer in the host protocol using the communication device, and for outputting the result to the output device, wherein the connection in the host protocol between the network storage device and the host computer is confirmed when a login command sent from the host computer to the network storage device is returned to the host computer within a predetermined time period, the network storage device to which the login command is sent being confirmed as having continuity in the network communication protocol in the network continuity confirmation step; and
an access confirmation process for confirming whether the host computer can access the volume of the network storage device specified by the accepted device identifier and volume identifier, and for providing the result to the output device, wherein the host computer is confirmed as accessing the volume when a mount command sent from the host computer to the network storage device is returned to the host computer within a predetermined time period, the network storage device to which the mount command is sent being confirmed as being connected in the host protocol to the host computer in the storage connection confirmation step.

9. A computer readable storage medium having a computer-readable program for execution by a host computer to confirm continuity with a network storage device for providing a volume via a network, the program comprising:
acceptance code for accepting the specification of a device identifier and a volume identifier from a user via an input device, wherein the device identifier is an identifier of a network storage device in a host protocol, wherein the volume identifier identifies the volume, wherein the host protocol is in a higher hierarchy than a network communication protocol used by the network; and
volume accessibility decision code for deciding whether the host computer can access the volume of the network storage device specified by the device identifier and volume identifier accepted in the acceptance code;
wherein the volume accessibility decision code comprises:
network continuity confirmation code for specifying a network identifier corresponding to the device identifier accepted in the acceptance code using a storage management table in which the relationship between the network identifier and the device identifier is registered, wherein the network identifier is an identifier of the network storage device in the network communication protocol, for confirming continuity in the network communication protocol between the network storage device having the specified network identifier and the host computer, and for outputting the result to an output device, wherein the network identifier identifies the network storage device in the network communication protocol, the continuity in the network communication protocol between the network storage device and the host computer being confirmed when a ping command sent from the host computer to the network storage device is returned to the host computer within a predetermined time period;

storage connection confirmation code for confirming connection in the host protocol between the network storage device having the device identifier accepted in the acceptance code and the host computer, and for outputting the result to the output devices, wherein the connection in the host protocol between the network storage device and the host computer is confirmed when a login command sent from the host computer to the network storage device is returned to the host computer within a predetermined time period, the network storage device to which the login command is sent being confirmed as having continuity in the network communication protocol in the network continuity confirmation step; and access confirmation code for performing access confirmation for confirming whether the host computer can access the volume of the network storage device specified by the device identifier and volume identifier accepted in the acceptance code, and for outputting the result to the output device, wherein the host computer is confirmed as accessing the volume when a mount command sent from the host computer to the network storage device is returned to the host computer within a predetermined time period, the network storage device to which the mount command is sent being confirmed as being connected in the host protocol to the host computer in the storage connection confirmation step.

* * * * *